Figure 3:
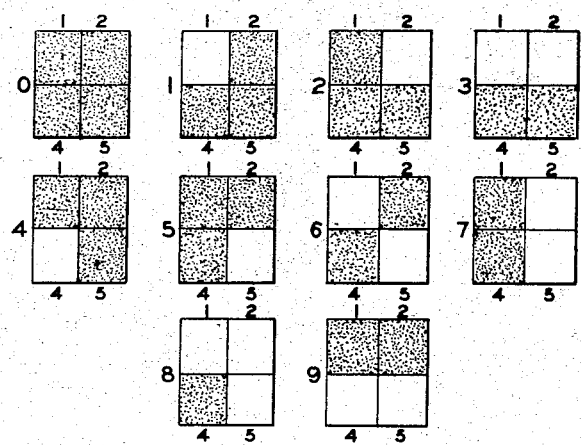

March 30, 1943.  L. G. SCHIMPF  2,315,456
CALL INDICATOR
Filed May 15, 1940   3 Sheets-Sheet 1

INVENTOR
L. G. SCHIMPF
BY John A Hall
ATTORNEY

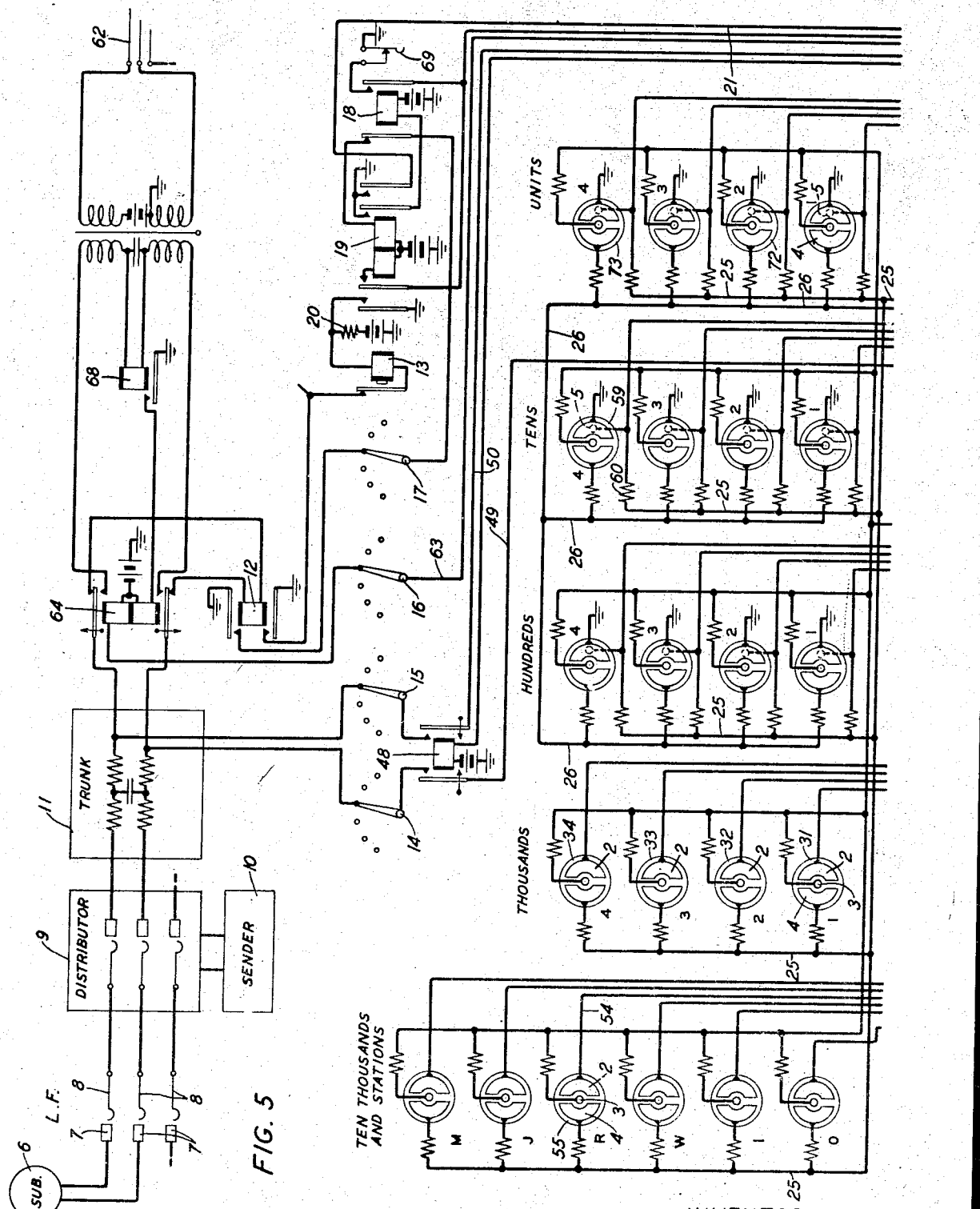

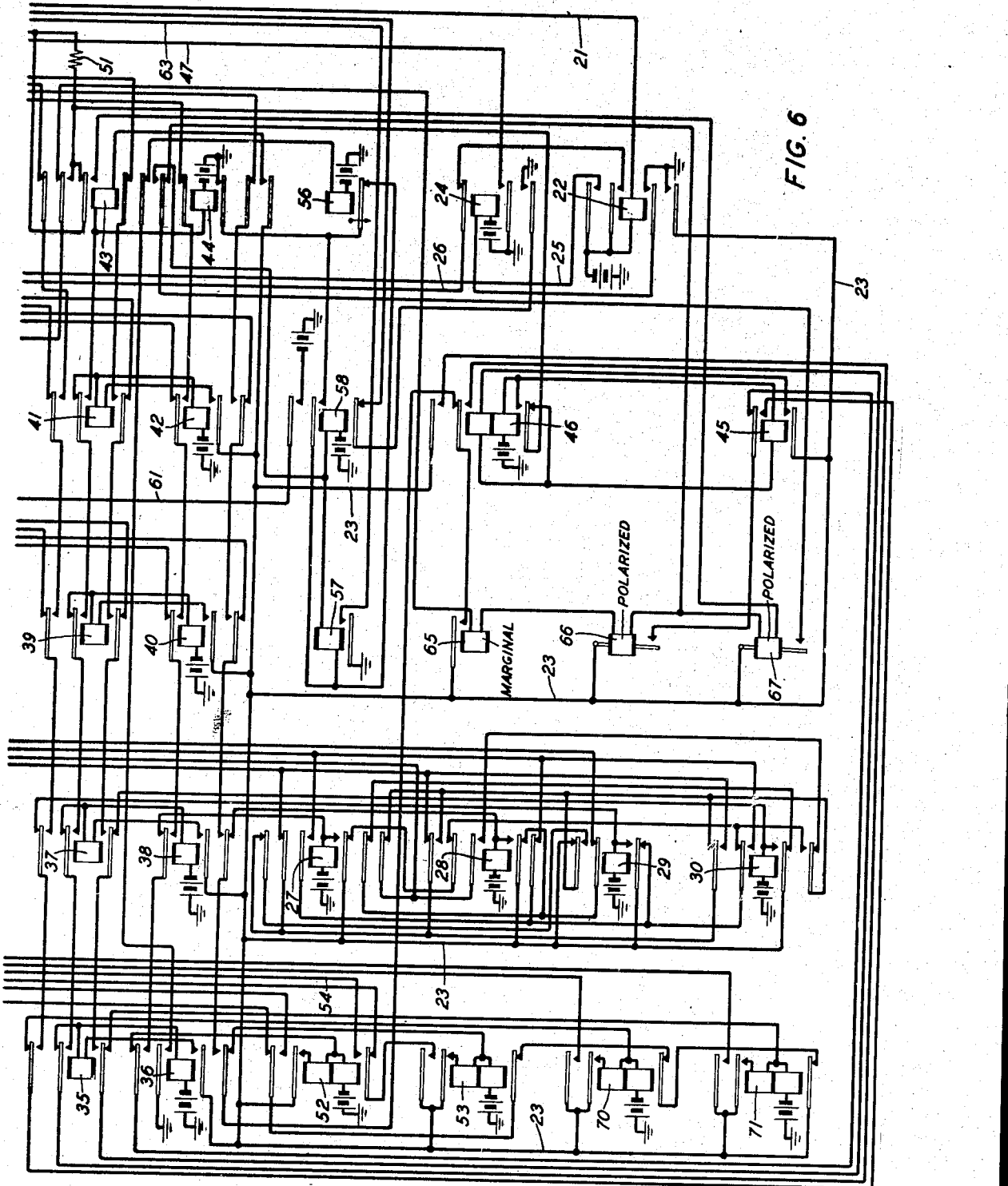

Patented Mar. 30, 1943

2,315,456

UNITED STATES PATENT OFFICE 2,315,456

CALL INDICATOR

Luther G. Schimpf, St. George, N. Y., assignor to Bell Telephone Laboratories, Incorporated, New York, N. Y., a corporation of New York Application May 15, 1940, Serial No. 335,205

3 Claims. (Cl. 177—337)

This invention relates to signaling systems and particularly to number indicator systems used in telephone systems for making visual display of telephone numbers.

In certain types of central offices an equipment known as a call indicator is employed. This apparatus is generally in the form of a visual display annunciator placed before a forwarding operator and is operated from a distant point.

The object of the present invention is to provide a simple, economical and efficient equipment which will be rugged in construction and require little maintenance.

A feature of the invention is the use of a code indicator whereby numbers may be indicated by the display of appropriate elements in a code system rather than through the display of arabic numerals.

Another feature is the use of permutation code of a small number of elements. In the specific embodiment of the present invention herein disclosed a four-element permutation code based upon an algebraic conception is employed.

Still another feature of the present invention is the use of display elements which require only transient energization to place them in operation. In the example given gaseous tubes are used which are fired by short impulses and then remain in operative condition until their complete function has been accomplished.

Another feature is the use of display elements which require only a transient energization to prepare them for ultimate operation. By this means the various elements of the call indicator are set by serial action and are later caused to give an indication by a further simultaneous action. Specifically the gaseous tubes are weakly energized and thereafter selectively prepared for final brilliant operation through signals sent serially but this first weak energization is at such a level that no visible indication is given. Later when the series of selective signals has been completely received another operation simultaneously brings all energized tubes up to such an energized level that a visible indication is given.

Another feature of the invention resides in the method of operating the groups of tubes, each group indicating one digit which consists in first, energizing all of the tubes of the group, second, maintaining all of the tubes energized at a low level, third, selectively and sequentially deenergizing the tubes and fourth, bringing those tubes not deenergized up to full brilliance.

A further feature of the invention is the use of gaseous tubes which may be initially ionized in such a manner that luminescence is not apparent or at least is unnoticeable. The tubes may be further ionized so that they later become noticeably luminescent. According to this feature the tubes are so constructed that in the position from which they are viewed the electrode from which they are maintained energized after being initially ionized, is hidden from view so that even a low level sustaining ionization does not produce marked luminescence.

Another feature of the present invention is a physical arrangement of the four elements of the permutation code indicators whereby the visible configuration of the displayed elements forms part of the code. In the specific embodiment of the invention herein disclosed a square surface is subdivided into four smaller squares or quadrants each of which represents one element of the four-element code whereby the illumination of these four elemental square surfaces in different combinations comprise a code.

Figure 1:
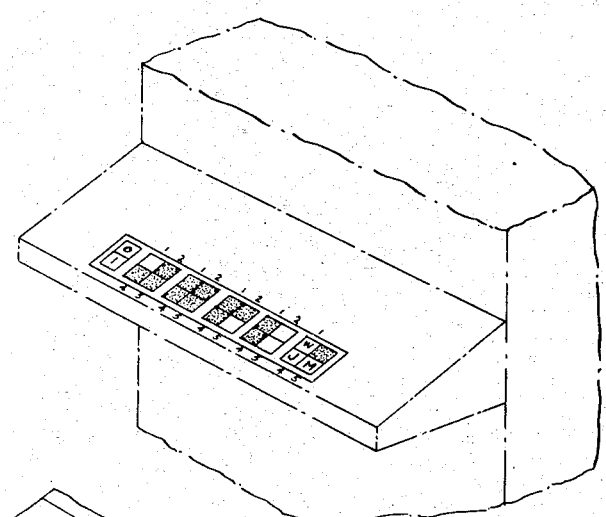
Figure 2:
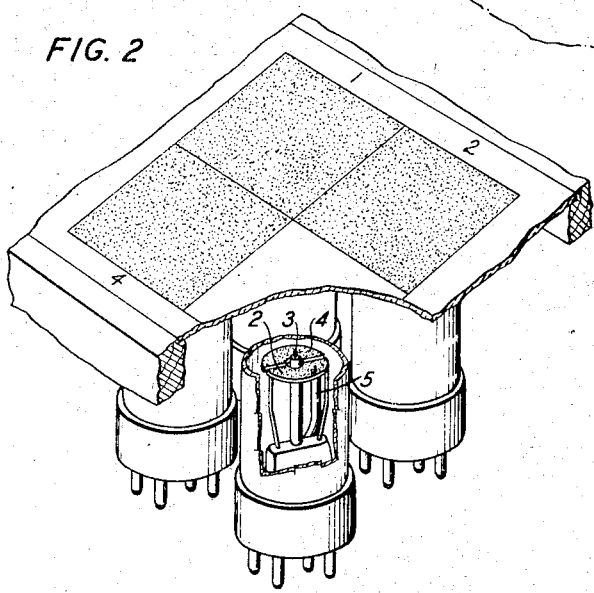

The drawings consist of three sheets, the first showing four figures as follows:

Fig. 1 is a perspective indication of the placing of a call indicator on a telephone operator's switchboard shelf. In this figure the telephone number 1057R is shown in code, Fig. 2 is an enlarged cut-away perspective view of one indicator showing the square display surface with an indication of the four tubes thereunder, Fig. 3 is an indication of the code employed, and Fig. 4 is a sectional outlet of an appropriate design of the tube, Figs. 5 and 6 on the other two sheets of drawings, when placed with Fig. 5 above Fig. 6, comprise a circuit diagram for explaining the method of operation.

In Fig. 3 there are ten squares each one numbered at its left-hand side with the arabic numerals, 0 to 9 inclusive. In this figure the code for 0 shows four lighted quadrants, the code for 1 shows three lighted quadrants with the upper left-hand quadrant dark, the code for the numeral 2 shows three lighted quadrants with the upper right-hand quadrant dark, etc. This code is based on an algebraic conception. In Fig. 2 the upper left-hand quadrant is marked 1, the upper right-hand quadrant is marked 2, the lower left-hand quadrant is marked 4 and the lower right-hand quadrant should be marked 5. The value of the digit is the sum of the unlighted quadrants, thus in Fig. 3 with the upper left-hand quadrant dark the numeral 1 is indicated. The numeral 3 is indicated by the unlighted condition of the upper left and upper right quadrants which have the numeral values 1 and 2, the sum of which is 3. In like manner the numeral 7 is indicated by the unlighted state of the upper right and lower right quadrants whose numerical values are 2 and 5 and whose sum is 7.

Figure 4:
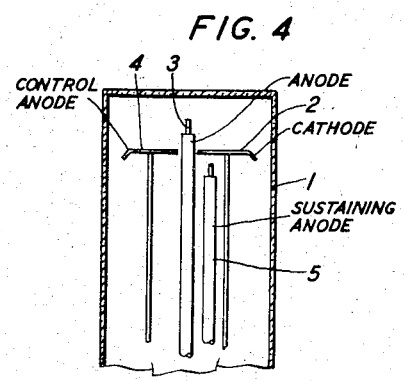

Fig. 4 shows an appropriate design of a cold cathode glow lamp. The glass envelope 1 is flattened at the top so that it may be placed near the display surface under which it is mounted. The cathode 2 is a semicircular disc as indicated in Fig. 2. The anode is a rod 3 extending upwardly through the axis of the cylindrical tube to a point near the flattened end surface of the tube. A control anode 4 takes a form similar to the cathode 2. There is also a sustaining anode 5 placed beneath the cathode 2.

In operation a sustaining potential is placed on the sustaining anode 5 but this does not ionize the tube. At some later time a potential is momentarily placed on the control anode 4 which results in the ionization of the tube. Thereafter the potential of the sustaining anode 5 is sufficient to maintain the tube in an ionized condition but the cathode spot or the cathode glow is so weak that it will not be noticed by one viewing the tube from the top, particularly as the sustaining anode is below the cathode and a greater portion of the discharge will be to the bottom of the cathode. At a later time the anode 3 is energized whereupon the top of the tube is filled with a luminescent glow.

One method of operation of this tube, when it forms part of a plurality of such tubes in a circuit similar to that about to be described, is to, first, energize the sustaining anode 5, second, to fire the tube through transiently energizing the control anode 4, later to selectively quench the tubes by transiently shunting the sustaining anode 5 and, lastly, to place an operating potential on the anode 3 whereby those tubes which have been quenched will remain dark and those tubes which have not been quenched will be brought up to ful luminescence.

In the drawings shown in Figs. 5 and 6 a telephone connection is indicated in a highly schematic manner. A subscriber's station 6 is connected by a line finder indicated by the line terminals 7 and the brushes 8 to a selector switch 9. When the subscriber's line from the substation 6 has been connected through the line finder, a sender 10 will be connected to the line and this will receive the numerical digit trains of impulses sent from the substation for establishing the wanted connection. When the designation of the called line has been properly registered the line will be extended to a trunk 11 whereupon a start relay 12 will be energized. This relay, through its lower armature, will place ground on the stepping magnet 13 of the switch indicated by the wipers 14, 15, 16 and 17 and this switch will operate until the particular trunk has been found whereupon a connection from ground through the upper armature of relay 12 will be extended over the wiper 17, the left-hand armature and back contact of relay 18, the right-hand winding of relay 19 to battery. Relay 19 operates in turn causing the operation of relay 18 and the deenergization of stepping magnet 13. The battery including resistance 20 for operating stepping magnet 13 is shunted by the outer left-hand armature of relay 19 so that the brushes 14 to 17, inclusive, cannot step further. Through its inner left-hand armature and front contact relay 19 operates relay 18 and this relay in turn places a holding ground on the left-hand winding of relay 19 to maintain this latter relay energized for the time being.

Through its outer right-hand armature and front contact relay 19 places a ground on conductor 21 leading to the holding relay 22. Relay 22 operates and performs several functions as follows: First, through its lower outer armature and front contact relay 22 places a ground on the conductor 23 which has been numbered at various places to indicate its wide distribution. Secondly, relay 22 through its front contact and inner lower armature causes the energization of relay 24. Thirdly, through its upper outer armature and front contact relay 22 places battery on conductor 25. It will be noted in Fig. 5 that conductor 25 leads to all of the sustaining anodes 5 of the tubes in the hundreds, tens and units columns. Conductor 25 also leads to the control anodes 4 in all of the tubes in the ten thousands, stations and thousands tubes. Fourthly, through its inner upper armature and front contact relay 22 places battery through the back contact and upper armature of relay 24 on conductor 26. It will be noted in Fig. 5 that conductor 26 leads through appropriate resistances to the control anode 4 of all of the tubes in the hundreds, tens and units columns. The energization of these control units is transient and lasts only until the relay 24, which is slightly slow in operating, has opened the circuit of conductor 26. However, all of the tubes in the hundreds, tens and units columns have now been fired and when relay 24 becomes energized they remain ionized through their sustaining anodes 5 but without causing any visible indication on the key shelf of the operator. The tubes in the thousands column will also likewise be fired through their control anodes 4, since each of the cathodes will find a circuit to ground on conductor 23 through the armatures and contacts of relays 27, 28, 29 and 30. Ionization of these tubes, however, will be low as compared to the final ionization that will occur when their anodes 3 are energized.

The circuit for tube 31 may be traced from the cathode 2 through the back contact and middle upper armature of relay 27, the upper outer armature and back contact of relay 30, the upper outer armature and back contact of relay 29 to ground on conductor 23.

The connection for tube 32 may be traced from its cathode 2 through the outermost lower armature and back contact of relay 27, the upper outer armature and back contact of relay 29 to ground on conductor 23. The circuit for tube 33 may be traced from its cathode 2 through the back contact and outer lower armature of relay 28 and thence through the back contact and lower armature of relay 29 to ground on conductor 23. The circuit for tube 34 may be traced from its cathode 2 through the back contact and inner upper armature of relay 29 and thence through the back contact and inner lower armature of relay 28 to ground on conductor 23.

The relays 27, 28, 29 and 30 are a translating means for converting the standard call indicator code for the thousands digit into the standard operation of call indicator responsive devices for the hundreds, tens and units indicators.

It should be explained that it is standard practice for call indicators to be energized by signals in code combinations and that the standard call indicator code is used herein to operate these cold cathode glow lamps. The standard call indicator code consists in the sending of positive and negative impulses. In all cases the positive impulses are of a given strength which is insufficient to cause the operation of a marginal relay 65 but is sufficient to cause the operation of the polarized relay 66. The negative impulses are in some cases of this same strength and will therefore cause the energization of the relay 67 but not the energization of the marginal relay 65. In other cases the negative impulses are of greater strength and will cause the energization of both relays 65 and 67. Hereafter these impulses will be spoken of as light positive, light negative and heavy negative impulses.

It will be noted that the extreme left-hand column of tubes are marked ten thousands and stations. In standard practice one of these tubes will invariably become luminescent to give an appropriate indication. The two lowermost of these tubes marked 0 and 1 are physically placed in the operator's position at the extreme left whereas the other four marked W, R, J and M are placed at the extreme right. In this code that one of these six tubes which becomes luminescent represents the desired indication. In some exchanges there may be over 9,999 lines, that is, there may be a small number of lines which will require a five digit designation. In this case the second tube from the bottom is illuminated to indicate a ten thousand number. No party lines will be provided for numbers requiring five digits. Where a four digit number is used and there is no party line designation then the lowermost tube in this column will be rendered luminescent.

The code described above consists of open periods, light and heavy negative pulses and light positive pulses. These pulses last for about 60 milliseconds each with no spacing between periods, each digit has four 60 millisecond periods with a light or heavy negative pulse in the second and fourth periods and either an open or light positive pulse in the first and third periods. There is no spacing between digits. The code is as follows: The character = represents a heavy negative impulse.

| Digits | | | Pulses required periods | | | |
|---|---|---|---|---|---|---|
| Sta. | Thousands | Hundreds tens units | 1 | 2 | 3 | 4 |
| 0 | 0 | 0 | | − | − | − |
| 1 | 2 | 1 | + | − | − | − |
| W | 4 | 2 | | = | − | − |
| R | 6 | 3 | + | = | + | − |
| J | 8 | 4 | | − | + | = |
| M | 1 | 5 | | = | − | = |
| | 3 | 6 | + | − | − | = |
| | 5 | 7 | | = | + | = |
| | 7 | 8 | + | = | + | = |
| | 9 | 9 | | − | + | = |

For explaining the action of the relays 27 to 30 inclusive, the following table has been prepared:

| Thousands | Period | | | | Relays | | | | Tubes remaining luminescent | | | |
|---|---|---|---|---|---|---|---|---|---|---|---|---|
| | 1 | 2 | 3 | 4 | 27 | 28 | 29 | 30 | 31 | 32 | 33 | 34 |
| 0 | | − | | − | | | | × | × | × | × | × |
| 1 | + | − | | = | | | | × | × | × | × | ×× |
| 2 | + | − | | = | × | | | × | × | × | ×× | × |
| 3 | | = | | = | | | | × | × | × | ×× | × |
| 4 | | − | | − | | × | | × | × | × | × | × |
| 5 | | = | | = | | ××× | | × | × | ×× | × | × |
| 6 | + | = | | = | × | | | × | × | ×× | ×× | × |
| 7 | + | = | | = | × | ×× | | × | × | × | ×× | × |
| 8 | | = | + | = | | | × | | × | × | ×× | × |
| 9 | | − | + | = | | | × | × | × | × | × | × |

In this the thousands code has been rearranged in numerical order, the + marks indicate the operation of the relays 27 to 30, inclusive, in their appropriate columns and the operation of tubes 31 to 34, inclusive, in their appropriate columns.

To explain also the operation of the ten thousands and stations tubes and the hundreds, tens and units tubes the following table has been prepared:

| Digit | Period | | | | Tubes, hundreds tens units | | | | Digit | Ten thousands and stations | | | | | | Relays | | | |
|---|---|---|---|---|---|---|---|---|---|---|---|---|---|---|---|---|---|---|---|
| | 1 | 2 | 3 | 4 | 1 | 2 | 4 | 5 | | 0 | 1 | W | J | R | M | 52 | 53 | 70 | 71 |
| 0 | | − | | − | × | × | × | × | 0 | × | | | | | | | | | |
| 1 | + | − | | − | | × | ×× | ×× | 1 | | × | | | | | × | | | |
| 2 | + | = | | − | | | ×× | ×× | W | | | × | | | | × | × | | |
| 3 | | = | + | − | | | ×× | × | R | | | | | × | | | | × | |
| 4 | | − | + | = | × | × | × | | J | | | | × | | | | | | × |
| 5 | | = | | = | × | ×× | × | | M | | | | | | × | | | | |
| 6 | + | − | | = | | × | ×× | | | | | | | | | | | | |
| 7 | | = | | = | × | | ×× | | | | | | | | | | | | |
| 8 | + | = | + | = | × | | ×× | | | | | | | | | | | | |
| 9 | | − | + | = | × | × | | | | | | | | | | | | | |

The negative pulses are used to control the stepping chain which comprises two relays for each column of tubes shown in Fig. 5, for instance, relays 35 and 36 associated with the ten thousands and stations tubes, relays 37 and 38 associated with the thousands tubes, relays 39 and 40 associated with the hundreds tubes, relays 41 and 42 associated with the tens tubes and relays 43 and 44 associated with the units tubes.

There is a well-known combination of relays as the W and Z relay combination. Relay 45 is the W relay and relay 46 is the Z relay. In the example about to be given the telephone number to be sent by the sender 10 into this circuit will consist of the designation R1057 and the complete code of pulses will be as follows:

| 1 | 2 | 3 | 4 | 1 | 2 | 3 | 4 | 1 | 2 | 3 | 4 | 1 | 2 | 3 | 4 | 1 | 2 | 3 | 4 |
|---|---|---|---|---|---|---|---|---|---|---|---|---|---|---|---|---|---|---|---|
| + | − |   | − |   | − |   | − |   | − |   |   |   | − |   | − |   | − |   | − |
| R |   |   |   | 1 |   |   |   | 0 |   |   |   | 5 |   |   |   | 7 |   |   |   |

It will be noted in this code that each designation has in it two negatives pulses. Upon the first negative impulse the W relay here designated 45 will be energized. At the end of this impulse the Z relay designated 46 will become energized. Upon the arrival of the next negative impulse the W relay will become deenergized and at the end of this negative impulse the Z relay will become deenergized. Thus, through each designation the W and Z relays will operate in a cycle including all possible combinations of the energized and deenergized states. By the action of the Z relay in each case the chain relays for the digit just registered will be operated to extend the chain to the next digit.

Going back now to the chain of operations resulting in the movement of the brushes 14 to 17 inclusive to the seized trunk level and the consequent operation of relays 22 and 24, it will be noted that upon the energization of relay 24 the ground is extended over conductor 47 to the winding of relay 48. Relay 48 connects the trunk conductors through the wipers 14 and 15 to conductors 49 and 50, respectively. Conductor 49 may be traced through the middle upper armature and back contact of relay 43 through the winding of marginal relay 65, the winding of the light positive relay 66, the winding of light negative relay 67, back contact and inner upper armature of relay 43 to conductor 50 and this bridged across the trunk comprises a signal to the sender 10 whereby the sender is caused to begin its sending of the call indicator code impulses above set out.

Upon the arrival of the first impulse, which is a light positive impulse, relay 66 will become energized. Thereupon ground from conductor 23 will be extended over the upper armature and back contact of relay 45 and thence through the upper outer armature and back contact of relay 36 to the winding of relay 52. Relay 52 locks through its upper winding to ground on conductor 23. Upon the second impulse, which is heavy negative, both relays 65 and 67 will become energized. Relay 67 will extend ground from conductor 23 over the lower outermost armature of relay 42 and its back contact through the lower armature and back contact of relay 46, winding of relay 45, lower winding of relay 46 to battery. Relay 45 operates in this circuit but the current flowing through the lower winding of relay 46 alone is insufficient to cause the operation of this latter relay 46. Relay 65 will extend ground from conductor 23 through its armature and front contact, the inner upper armature and back contact of relay 45, the outer lower armature and back contact of relay 36, lower winding of relay 53 to battery. Relay 53 becomes operated and locks to ground on conductor 23.

At the end of this negative impulse the original energizing circuit for relay 45 will be opened but a circuit may now be traced from battery, the lower winding of relay 46, the winding of relay 45, the upper winding of relay 46, the front contact and lower armature of relay 45 to ground on the conductor 23 so that relay 46 now becomes operated.

The next impulse is a light negative impulse resulting in the operation of relay 67 alone. Relay 67 now connects ground from conductor 23 through the outermost lower armature and back contact of relay 42, the lower armature and front contact of relay 46 to the conductor joining the lower winding of relay 46 and the winding of relay 45. Relay 45 and the upper winding of relay 46 are thus shunted resulting in the deenergization of relay 45 but the holding of relay 46. At the end of this impulse when relay 67 returns to the position shown, relay 46 becomes deenergized.

Thus relays 52 and 53 will have been operated by the code for station letter R. Thereupon a circuit may be traced from ground on conductor 23 through the outer upper armature and front contact of relay 53, the lower armature and front contact of relay 52, conductor 54 to the cathode 2 of tube 55. Through the potential on the conductor 25, tube 55 will be ionized at a low level ready for complete ionization through its anode 3 at a later time as will be hereinafter explained.

It has been shown above how the W relay 45 becomes energized at the beginning of the first negative impulse, how the Z relay 46 becomes energized at the ending of the first negative impulse, how the W relay 45 becomes deenergized at the beginning of the second negative impulse and how the Z relay 46 becomes deenergized at the end of the second negative impulse. It should now be noted that the pairs of relays 35, 36, etc. follow the action of the W and Z relays. Thus, at the end of the first negative impulse when the Z relay 46 becomes energized a connection is extended from ground on conductor 23 through the outer upper armature of relay 46, the inner upper armature and back contact of relay 35, winding of relay 36 to battery. Thus, relay 36 becomes energized simultaneously with the energization of the Z relay 46. Relay 36 now connects ground from conductor 23 through its inner lower armature and front contact to the winding of relay 35 but since the other terminal of relay 35 is also connected to ground this connection is ineffective for the time being. When the Z relay 46 becomes deenergized at the ending of the second negative impulse this short circuit about the winding of relay 35 disappears and relay 35 now becomes energized in series with relay 36. In this manner the control of relays 65, 66 and 67 is transferred from the ten thousands and stations indicators to the thousands indicators.

Upon the energization of relay 36 a connection is extended from ground, the inner upper armature and front contact of relay 36 through the middle and lower armature and back contact of relay 43 to the winding of relay 56. Relay 56 in attracting its armature opens the circuit for relays 57 and 58 so that neither of these relays will become energized until after the units registration has been made.

According to the example given the telephone number to be written up is 1057 station R. The station designation R has been written up and now the thousands designation 1 is to be registered. This consists of a light negative followed by heavy negative impulses. Upon the first light negative impulse relay 67 becomes energized whereupon ground is extended from the armature and contact of relay 67 through the outermost lower armature and back contact of relay 43, the lower armature and back contact of relay 46, the winding of relay 45, the lower winding of relay 46 to battery whereupon the W relay 45 becomes energized. At the end of this impulse the relay 46 becomes energized as hereinbefore described. At this time also relay 38 becomes energized in a manner similar to that heretofore described. Upon the next impulse which is a heavy negative impulse, the marginal relay 65 becomes energized whereupon a connection is extended from ground on conductor 23 through the armature and front contact of relay 65, the inner upper armature and front contact of relay 46, lower armature and front contact of relay 35, the lower armature and back contact of relay 37, the winding of relay 30 to battery. Relay 30 becomes energized in this circuit and locks itself to ground on conductor 23. At the end of this heavy negative impulse relay 46 becomes deenergized resulting in the energization of relay 37 thus advancing the chain to the hundreds group of tubes.

Through the energization of relay 30 the heretofore described connection of ground to the cathode 2 of tube 31 will be opened so that tube 31 is thus selectively deenergized.

The next series of impulses to be registered on the hundreds indicator consists of two light negative impulses representing the digit 0. In accordance with these impulses not one of the tubes in the hundreds column will be disturbed but the two negative impulses will result in the energization first of relay 40 and then of relay 39 thus advancing the chain to the tens column. In this case the code is presented by a light negative impulse followed by a heavy negative impulse. At the end of the light negative impulse, relay 42 will become energized. Thereafter the heavy negative impulse will result in the connection of ground from conductor 23 through the armature and front contact of relay 65, the inner upper armature and front contact of relay 46, the lower armature and front contact of relay 35, the lower armature and front contact of relay 37, the lower armature and front contact of relay 39, the lower armature and back contact of relay 41 to the sustaining anode 5 of tube 59. This momentary ground on the sustaining anode 5 will shunt the potential connection thereto through the resistance 60 sufficiently to quench the tube 59. Tube 59 represents the No. 5 tube and through its failure to light brilliantly at a later period will indicate the digit 5.

At the end of the heavy negative impulse relay 41 becomes energized and extends the chain to the units register. The units code consists of two heavy negative impulses, the first of these will result in the extension of a ground through the armature and front contact of relay 65, the inner upper armature and back contact of relay 46, the lowermost armatures and front contacts of relays 36, 38, 40 and 42 and the middle lower armature and back contact of relay 44 to the sustaining anode 5 of tube 72 thus quenching this tube. The second heavy negative impulse will likewise result in the quenching of tube 73. Tube 72 is the No. 2 tube and tube 73 is the No. 5 tube, their algebraic sum is 7 so that through their failure to light brilliantly a moment later the units indicator will indicate the digit 7.

Two types of senders 10 can be connected to this circuit. Some senders send a heavy positive pulse after the units digit has been transmitted while other senders do not send the heavy positive pulse. Since the most general case is the condition where the heavy pulse may or may not be sent the circuit is designed to meet this requirement. Relay 43 operates at the termination of the last unit pulse and locks in series with relay 44. These relays operated open the leads to the units digit tubes and relay 44 connects ground to a contact of relay 56. Relay 56, as before described, was operated upon the operation of relay 36 through the middle lower armature and back contact of relay 43 but now that relay 43 has become energized relay 56 returns to normal.

The operation of relay 43 reverses the tip and ring leads to the light negative relay 67 and renders inoperative the light positive and marginal relays 66 and 65. Thus, relay 67 is connected in a circuit whereby it will respond to a positive impulse. The circuit may be traced from the switch wiper 14 through the front contact and left-hand armature of relay 48, the middle upper armature and front contact of relay 43, the winding of relay 67, the front contact and inner upper armature of relay 43, conductor 50, right-hand armature and front contact of relay 48 to wiper 15. The resistance 51 is shunted across the winding of relay 67. The contact of relay 67 is transferred by the outermost lower armature of relay 43 to the winding of relay 58.

The operation of relay 43 also opens the hereinbefore described circuit for relay 56 and this relay becomes deenergized. The relay, however, is slow to release so that if the sender 10 is equipped to send a heavy positive impulse at the end of the units series this may operate relay 67 before relay 56 has made its back contact. In this case relay 67 connects ground through the outermost lower armature and front contact of relay 43 to the winding of relay 58. If the panel sender is not equipped to send this positive impulse then the energization of relay 58 awaits the complete release of relay 56. At this time ground is connected through the front contact and inner lower armature of relay 54 and the armature and back contact of relay 56 through the windings of relays 57 and 58 in series. Relay 58 through its outer upper armature connects battery to conductor 61 which leads to the anodes of all of the tubes and brings those which are still ionized up to full brilliance whereby the number of the called telephone line is displayed before the operator having under her control the plug 22.

In the first assumed case where the operation of relay 58 is controlled by a heavy positive impulse it should be noted that the operation of relay 58 connects ground from the innermost lower armature and front contact of relay 44 to the winding of relay 57 but relay 57 does not operate as long as this positive impulse persists. As soon as it ceases, however, relay 57 becomes energized in series with relay 58. Upon the energization of relay 57 a ground is connected through the armature and front contact of relay 57 to conductor 63 which may be traced through the wiper 16 to the upper winding of relay 64. Relay 64, thereupon, becomes energized and extends the trunk conductors through to the winding of relay 68. Relay 68 maintains relay 64 energized thereafter. Relay 64 cuts off the starting relay 12.

When the operator completes the connection and has no longer need to view the call indicator she may release this apparatus by depressing key 69 which opens the holding ground for relay 19 and since at this time relay 12 has become deenergized, relay 19 will release. When relay 19 releases the ground for holding relay 22 is removed from conductor 21 and the circuit is returned to normal.

What is claimed is:

1. An indicating device comprising a gaseous discharge device in a tubular envelope having a substantially flat circular end portion, said device having an anode and cathode so constructed and arranged that the discharge therebetween will illuminate said end portion of said envelope, a control anode visible through said end portion of said envelope and a sustaining anode at a point remote from said end portion of said envelope and arranged behind said cathode whereby any glow discharge between said sustaining anode and said cathode is invisible through said end portion of said envelope.

2. A gas discharge tube for use as a signaling means comprising a bulb containing an inert gas, a press within the bulb, a substantially flat circular end portion of said bulb through which a glow discharge may be viewed, a substantially flat semicircular cathode supported by said press, a substantially flat semicircular control anode supported by said press, said semicircular elements being in a plane parallel to said flat end portion of said bulb, an axially located anode supported by said press and extending to a point substantially midway between the plane of said semicircular elements and said flat end portion of said bulb whereby a glow discharge on the face of said cathode visible through said flat end portion may be produced, and a sustaining anode supported by said press and hidden from view behind said cathode.

3. A signaling device consisting of a bank of visible display indicators each consisting of a tube constructed according to claim 1, a circuit arrangement responsive to seizure of said device for simultaneously applying an operating potential between the said sustaining anode and the said cathode of all of said tubes, transiently operated means further responsive to seizure of said device for applying a striking potential to the said control anodes of all of said tubes, means responsive to coded impulses for selectively applying a quenching potential to said sustaining anodes and means responsive to the completion of a coded train of impulses for applying an operating potential between the said anode and the said cathode of all of said tubes, whereby the unquenched tubes of said bank are caused to visibly glow.

LUTHER G. SCHIMPF.